United States Patent
Soens et al.

(10) Patent No.: US 11,952,510 B2
(45) Date of Patent: Apr. 9, 2024

(54) TEXTILE COATING COMPOSITION

(71) Applicants: DEVAN CHEMICALS, Ronse (BE); VALEO SYSTEMES THERMIQUES, Le Mesnil Saint Denis (FR)

(72) Inventors: Hugo Soens, Kaster (BE); Maxime Girault, Saint Georges des Groseillers (FR); Samuel Gobillard, Athis de l'Orne (FR); Younick Portal, Flers (FR)

(73) Assignees: Devan Chemicals, Ronse (BE); Valeo Systemes Thermiques, Le Mesnil Saint Denis (FR)

( * ) Notice: Subject to any disclaimer, the term of this patent is extended or adjusted under 35 U.S.C. 154(b) by 995 days.

(21) Appl. No.: 16/335,139

(22) PCT Filed: Sep. 22, 2017

(86) PCT No.: PCT/EP2017/074115
§ 371 (c)(1),
(2) Date: Mar. 20, 2019

(87) PCT Pub. No.: WO2018/055127
PCT Pub. Date: Mar. 29, 2018

(65) Prior Publication Data
US 2019/0276686 A1  Sep. 12, 2019

(30) Foreign Application Priority Data

Sep. 23, 2016 (BE) .................................. 2016/5717
Sep. 23, 2016 (FR) ....................................... 1658971

(51) Int. Cl.
*C09D 7/65* (2018.01)
*B01D 46/00* (2022.01)
*B32B 5/26* (2006.01)
*C08K 5/134* (2006.01)
*C08K 5/54* (2006.01)
*C09D 5/02* (2006.01)
*C09D 5/14* (2006.01)
*C09D 7/63* (2018.01)
*C09D 131/04* (2006.01)
*C09D 199/00* (2006.01)
*C08K 5/5435* (2006.01)
*C08L 29/04* (2006.01)
*C08L 31/04* (2006.01)
*C08L 75/04* (2006.01)
*C08L 79/02* (2006.01)

(52) U.S. Cl.
CPC ........... *C09D 7/65* (2018.01); *B01D 46/0028* (2013.01); *B32B 5/26* (2013.01); *C09D 5/024* (2013.01); *C09D 5/14* (2013.01); *C09D 7/63* (2018.01); *C09D 131/04* (2013.01); *C09D 199/00* (2013.01); *B01D 2201/265* (2013.01); *C08K 5/5435* (2013.01); *C08L 29/04* (2013.01); *C08L 31/04* (2013.01); *C08L 75/04* (2013.01); *C08L 79/02* (2013.01)

(58) Field of Classification Search
None
See application file for complete search history.

(56) References Cited

U.S. PATENT DOCUMENTS

| 7,947,333 | B2 * | 5/2011 | Eriksson | ............... C23C 22/361 427/419.1 |
| 9,410,273 | B2 * | 8/2016 | Miyauchi | ............... D04H 3/147 |
| 2006/0278086 | A1 * | 12/2006 | Inagaki | .................. B01D 46/10 96/223 |
| 2007/0131116 | A1 | 6/2007 | Inagaki et al. | |
| 2010/0209530 | A1 * | 8/2010 | Yamada | ............... D06M 13/238 424/617 |
| 2010/0272668 | A1 * | 10/2010 | Matsushita | ............... D01F 6/52 526/318.2 |
| 2012/0171276 | A1 * | 7/2012 | Fujimori | ................. D21H 21/36 424/650 |
| 2014/0147631 | A1 * | 5/2014 | Yang | ........................ B05D 5/08 428/143 |
| 2017/0151514 | A1 * | 6/2017 | Kihara | ...................... B32B 7/12 |

FOREIGN PATENT DOCUMENTS

| CN | 102257179 B | * | 5/2014 |
| DE | 10 2013 021071 A1 | | 6/2015 |
| EP | 1 985 350 A2 | | 10/2008 |
| JP | 2004042622 A | * | 2/2004 |
| JP | 2004197164 A | * | 7/2004 |
| JP | 2015 192778 A | | 11/2015 |
| WO | 2011/148160 A1 | | 12/2011 |

OTHER PUBLICATIONS

International Search Report dated Oct. 26, 2017, issued in corresponding International Application No. PCT/EP2017/074115, filed Sep. 22, 2017, 9 pages.
Written Opinion of the International Searching Authority dated Oct. 26, 2017, issued in corresponding International Application No. PCT/EP2017/074115, filed Sep. 22, 2017, 6 pages.

* cited by examiner

*Primary Examiner* — Tae H Yoon
(74) *Attorney, Agent, or Firm* — Christensen O'Connor Johnson Kindness PLLC

(57) ABSTRACT

The present invention relates to an aqueous coating composition for textiles, in particular for the cabin air filter of a motor vehicle, comprising at least one allergen denaturing agent and at least one compatibilizing agent for the at least one allergen denaturing agent.

15 Claims, No Drawings

TEXTILE COATING COMPOSITION

CROSS REFERENCE TO RELATED PATENT APPLICATIONS

This patent application is a National Stage of International Application No. PCT/US2017/074115, filed Sep. 22, 2017, which claims the benefit of French Patent Application No. 1658971, filed Sep. 23, 2016 and the benefit of Belgian Patent Application No. 2016/5717, filed Sep. 23, 2016, the entire disclosures of which are hereby incorporated by reference in their entirety for all purposes.

The present invention relates to an aqueous coating composition for a textile, in particular for a cabin filter, intended for a motor vehicle.

For many years now, allergies are a constraint for human beings and constitute a problem which is constantly increasing. Allergies are the result of the presence of allergens in the environment, which affect the individuals whose organism appears to be sensitive to the contact thereof.

Among the many existing allergies, allergies of a respiratory origin can be mainly responsible for allergic rhinitis, itchy nose, nasal discharge, frequent sneezing, loss of the sense of smell, etc.

A distinction is made between the so-called "persistent" allergenic rhinitis and the commonly called "intermittent" allergenic rhinitis by the duration of the persistence thereof. Indeed, a persistent type allergenic rhinitis typically relates to an allergy subsisting for more than four days and four weeks per year. It is moreover often associated with pollens, in the springtime. The intermittent type allergenic rhinitis relates to an activity with a duration of less than four days per week or less than four weeks per year.

Respiratory allergies are formed through allergens coming directly from the environment. Allergens are water-soluble proteins and have a three-dimensional structure, which involve specific sequences of amino acids. The expression of the allergenic nature of these sequences of amino acids is expressed through the appearance of antibody-antigen reactions.

Respiratory allergens can cause sleep disturbances and a sensation of discomfort for the individual suffering from such an allergy.

The suppression of allergens in the organism is a task that is recognised as being complex in the medical field because it aims to break down the allergen in order to render it inactive.

Along with that, there is also another pathway that calls upon allergen denaturing agents that make it possible to provide a chemical treatment of which the purpose is to reduce the action of allergens before entering into contact with the organism of an individual, by acting directly on the allergen, without altering or eradicating it in the organism.

Generally, allergen denaturing agents can in particular be applied on filtration materials, cleaning tools or instruments, or on textiles, and also in the form of spray.

It is therefore possible to reduce the presence of allergens in the environment and their harmful effects on the individuals who are sensitive to the interaction thereof, by allowing the integration of an anti-allergen function into a given product, which has an anti-allergen power.

Unfortunately, it appeared that the application of an allergen denaturing agent on a textile is not optimal, which leads to the formation of a textile of which the anti-allergen property cannot be guaranteed over time. It appeared that the impregnation of the composition made from an allergen denaturing agent on the textile constitutes one of the limiting steps of the application because it cannot be distributed homogeneously over the entire structure of the textile. In addition, a known composition made from an allergen denaturing agent has a high flow rate, which makes the application of such a composition complex, not very practical and not very effective.

There is a genuine need to be able to provide a coating composition that allows to coat an article, such as a textile, effectively and which has the desired anti-allergen function, while guaranteeing the retention of this function over time.

Document JP2008094906 discloses in particular an aqueous composition for air filters comprising an allergen denaturing agent that can be aluminium or zirconium salts possibly accompanied by tannic acid.

Document JP2006193624 relates to a composition for filters that can comprise as denaturing agent a pyridinium salt with, for example poly(acrylic acid) or poly(vinyl alcohol).

Document WO2014/019660 relates to a multilayer device for filtering the air of a cabin of which one of the layers is impregnated with a composition comprising a denaturing agent made from tannins, such as tannic acid.

The invention thus aims to provide a coating composition for a textile, in particular for a cabin filter, intended for a motor vehicle, that is easy to handle when it is applied on a material, for example on a non-woven fibres textile, while guaranteeing good applicability of the composition on the material to be impregnated. The purpose being to provide a coating that has a suitable flexibility for, for example forming a non-woven fibres coating that has a sustainable anti-allergen function.

To solve this problem, according to the invention there is provided an aqueous coating composition for a textile, in particular for the cabin filter for a motor vehicle comprising:
- at least one allergen denaturing agent (AdA, included as such in the present application), and
- at least one compatibilising agent of said at least one AdA.

Surprisingly, the compatibilising agent of said at least one AdA interacts favourably with the latter. Indeed, it has been observed that the compatibilising agent makes it possible to maintain flexibility of the AdA such that the coating obtained by means of the composition according to the invention has a suitable flexibility.

The denaturing agent is capable, as indicated by its name, of denaturing the activity of the allergen by binding itself to the latter for the purpose of modifying the three-dimensional structure thereof so as to inhibit the activity thereof. Thus, the AdA is a means that avoids having to suppress the allergen via decomposition, when it reaches the organism.

Moreover, the combination between the compatibilising agent and the AdA makes it possible to provide a composition that has a suitable flow rate, which greatly facilitates the application of the composition on a material, such as a non-woven fibres textile, while guaranteeing a homogeneous impregnation of the latter on the targeted material. Providing a homogeneous impregnation makes it possible in the end to provide a coating of which the anti-allergen property has an extended service life, with respect to what a known composition can provide.

The composition according to this invention therefore makes it possible to confer the anti-allergen function on the coating of a material that can be used in many fields of application, such as for example, in the field of floor coverings, sprays, textiles, etc.

Advantageously, the AdA according to the invention is an AdA comprising a polyphenols-based compound that can be part of the family of tannins and/or that can preferably be chosen from the group consisting of tannic acid, olive leaf extract consisting of oleuropein and mixtures thereof.

In a particular embodiment, the AdA is an inorganic AdA selected from the group consisting of alkaline earth metal salts, rare earth salts, zirconium salts, aluminium salts and mixtures thereof.

Preferably, wherein the AdA is a cationic AdA selected from the group consisting of quaternary ammonium salts, pyridinium salts and mixtures thereof.

According to a preferred embodiment, said compatibilising agent is selected from the group consisting of hydrophilic polymers, cationic polyelectrolytes, polycationics, anionic dispersions, functional silanes and mixtures thereof.

In a particularly advantageous embodiment of the composition according to the invention, the compatibilising agent is selected from the group consisting of polyallylamine, poly diallyldimethylammonium chloride, polyether amine epichlorohydrin resin, polyethyleneimine, a polyurethane dispersion, an acrylate dispersion, polyvinyl alcohol, polyvinyl acetate, functional silane, perfluoroalkyl acrylate and mixtures thereof.

Preferably the functional silane can be from the family of organosilanes including organoalkoxysilanes and having the following structure:

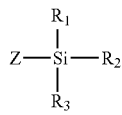

where Z represents a vinyl, allyl group or any other doubly bonded group capable of reacting during a radical polymerisation reaction, where $R_1$, $R_2$, and $R_3$ are reactive groups, such as a methoxy, ethoxy group and any other alkoxy, amino, epoxy, ureido, and vinyl group, chloride or bromide halogens, esters, such as acetoxy groups, or —O—Si or non-reactive groups such as hydrocarbon alkyl or aryl groups. $R_1$, $R_2$, and $R_3$ call all be of an identical or different nature but at least one of the R groups must be, more preferably reactive for the purpose of interacting favourably with the AdA.

In an illustrative and not restrictive manner, organofunctional silanes can be chosen from the list consisting of vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)propyltrimethoxysilane, 4-vinylphenylmethyltrimethoxysilane, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, and mixtures thereof.

Preferably the functional silane is an organosilane, preferably chosen from the group consisting of 3-glycidopropyltrialkoxysilane, glycidoxypropyltrimethoxysilane, 3-glycidoxypropyltriethoxysilane, 3-glycidoxypropylmethyldimethoxysilane, 3-glycidoxypropylmethyldiethoxysilane, and mixtures thereof.

Even more preferably, the functional silane contains an epoxy group, such as γ-glycidoxypropyl trimethoxysilane, γ-glycidoxypropylmethyldiethoxysilane, β-(3,4epoxycyclohexyl)ethyltrimethoxysilane, β-(3,4-epoxycyclohexyl)ethylmethyldiethoxysilane.

The composition according to the present invention advantageously comprises an antifungal agent, preferably chosen from the group consisting of 1,2-benzisothiazoline-3-one, zinc pyrithione, sodium sorbate, sodium benzoate and mixtures thereof.

Preferably, the composition according to the invention can comprise an anti-foaming agent, preferably selected from the group consisting of mineral oil, silicone, alcohol, tributyl phosphate, triethyl phosphate, and mixtures thereof.

Preferably, the mass ratio between the AdA and the polymer is between 15 and 70, preferably between 15 and 35.

More preferably, the composition according to the invention comprises between 40 and 75% of water, preferably between 45 and 70% of water, with respect to the total weight of the composition.

Advantageously, the composition comprises between 20 and 45% by weight of AdA, preferably between 20 and 35% by weight, with respect to the total weight of the composition.

Other embodiments of the composition according to the invention are indicated in the appended claims.

The invention also relates to an article on which is impregnated the composition according to the present invention.

Other embodiments of the article according to the invention are indicated in the appended claims.

The invention also has as an objective, a coating comprising a layer of non-woven fibres (i) impregnated with the composition according to the present invention.

Other embodiments of the coating according to the invention are indicated in the appended claims.

The present invention relates to an anti-allergen filter comprising at least one non-woven fibre filter layer on which is impregnated the composition according to the present invention.

Advantageously, said at least one filter layer is pleated in the form of an accordion.

More advantageously, the filter according to the invention is a combined filter for a cabin for a motor vehicle.

Other embodiments of the filter according to the invention are indicated in the appended claims.

The present invention furthermore has as object, a method for producing the anti-allergen filter according to the present invention, comprising the following steps:
  providing a non-woven fibre filter layer having a fibre size between 5 and 30 Dtex per filament, preferably between 10 and 20 Dtex per filament,
  impregnating the composition according to the present invention on said non-woven fibre filter layer.

Other embodiments of the method for producing the anti-allergen film according to the invention are indicated in the appended claims.

The present invention also relates to a device for purifying the air of the cabin of a motor vehicle comprising successively:
  (i) a non-woven fibre layer arranged to confer rigidity to the device, (ii) a filter layer intended to capture gaseous pollutants coming from a gaseous medium and applied on said non-woven fibre layer, and (iii) a particle filter layer made of non-woven microfibres, applied on said filter layer intended to capture gaseous pollutants coming from a gaseous medium, said non-woven fibre layer (i) being impregnated with the composition according to the invention.

According to a preferred embodiment, the device further comprises a support layer (iv), said filter layer (ii) intended to capture gaseous pollutants coming from a gaseous medium and said particle filter layer (iii) being connected mutually to one another by way of said support layer (iv).

Other embodiments of the device according to the invention are indicated in the appended claims.

The present invention also relates to a method for producing the device for purifying the air of a cabin of a motor vehicle comprising steps of:

providing a non-woven fibre layer (i), impregnating the composition according to the present invention on said non-woven fibre filter layer (i).

mounting a multilayer structure that successively comprises said non-woven fibre layer (i) and a filter layer (ii) intended to capture gaseous pollutants coming from a gaseous medium, and applying the multilayer structure on a particle filter layer (iii) made of non-woven microfibres.

Other embodiments of the method for producing the device for purifying the air of a cabin of a motor vehicle according to the invention are indicated in the appended claims.

Other characteristics, details and advantages of the invention will appear in the description given hereinafter, in a non-limiting manner.

In the context of this invention, the terms "comprising", "comprises", "including", "include", "containing" must be understood as not excluding the presence of an additional element with respect to the element in question. In addition, these terms can preferably by substituted with the expression "consists of", which thus excludes the presence of any other element with respect to the element in question.

In terms of the present invention, the term "spunbond" must be understood as meaning that the non-woven fibres can be obtained by spunbonding, which consists of applying the fibres on one another in the melted state. These non-woven fibres of the "spunbond" type confer a suitable rigidity to the textile. Thus, when the non-woven fibres textile forms one of the layers of a filter for the cabin of a motor vehicle, the rigidity of the filter is provided by the presence of this non-woven fibre layer.

In terms of the present invention, the expression "Dtex" is the abbreviation of the term decitex which is the international unit of fineness of textile fibres. It is therefore understood that 1 Dtex is the mass in, grams of a fibre having a length of 10000 metres.

In terms of the present invention, the term "meltblown" refers to a method of "melting-blowing" that makes it possible to provide non-woven microfibres. Thus, these microfibres have the capacity to filter smaller particles, with respect to the non-woven fibre layer (i) that has a higher fibre fineness.

In terms of the present invention, the expression "ELISA" is the abbreviation of "enzyme-linked immunosorbent assays" and relates to an immuno-enzymatic method intended to detect in small quantities the presence of allergens on a given product. In the context of the present invention, the sandwich "ELISA" test can be used to determine the efficacy of an article impregnated with the composition according to the invention in order to evaluate the anti-allergenic properties thereof.

More precisely, the sandwich "ELISA" test consists in reacting an allergen with an antibody, which is fixed on a solid phase. Then, an antibody-enzyme conjugate is implemented. The quantity of allergen targeted in the study is detected by coloration by using the enzyme associated with the antibody.

In terms of the present invention, the terms "combined filter" must be understood as meaning a bi-functional filter that is both a particle filter and a filter that stops harmful gases present in the surrounding air.

The composition according to the invention is more preferably intended to be used in a device for purifying the air of the cabin of a motor vehicle and in the field of textiles, more particularly on a non-woven fibres textile of the "spunbond" type.

It is well understood that the composition according to the present invention can also be used in other fields, for example to provide sprays, to cover materials that require a sustainable anti-allergenic function, in the field of medical equipment.

Thus, the composition according to the present invention requires at least the use of an AdA in combination with a compatibilising polymer capable of maintaining a sufficient flexibility of AdA. Indeed, this makes it possible to provide a coating that has the required flexibility.

According to a preferred embodiment, the composition according to the invention comprises an AdA which comprises a polyphenols-based compound of the tannin family, for example tannic acid, a polymer, such as 3-glycidopropyltrialkoxysilane, an antifungal agent and an anti-foaming agent.

Preferably, the composition can also comprise up to 10% by weight, with respect to the total weight of the composition, of an isopropyl alcohol to provide stability to the final product formed from the composition according to the invention, and also to further improve the impregnating of the composition on a textile, such a non-woven fibres textile, more preferably of the "spunbond" type.

As indicated hereinabove, the AdA can be of an inorganic or cationic nature.

The composition according to the invention can also comprise between 0.5 and 2% by weight of polymer, with respect to the total weight of the composition.

It has appeared that the use of glycerine in the composition makes it possible to provide a coating that has a flexibility such that it can be pleated and maintained in the pleated shape thereof.

The method for producing the composition according to the invention is a method that consists of mixing the AdA and the compatibilising polymer at ambient temperature.

The adding of other components can also be carried out, as has been indicated hereinabove.

The composition according to the invention can be applied by impregnating on a coating that comprises a layer of non-woven fibres (i).

The layer of non-woven fibres (i), preferably of the "spunbond" type, can be impregnated with the composition according to the invention by applying the latter by vaporisation, padding, dip-coating, soaking, or by passing the layer of non-woven fibres (i) in a bath containing the composition according to the present invention.

The application of the composition on the layer of non-woven fibres (i) can be carried out according to a continuous or discontinuous process (batch).

The layer of non-woven fibres (i) thus impregnated with the composition according to the invention can be used to form at least one layer of a filter that has the anti-allergen function and being provided to be arranged in the cabin of a motor vehicle.

In this manner, the filter can be multifunctional in that it is arranged to treat the air and inhibit the allergens transported by the surrounding air, which is particularly advantageous for the user.

To increase the capacity of the filter to purify the air, the non-woven fibre layer can be pleated in the form of an accordion in order to increase the contact surface between the filter medium, formed by the non-woven fibre layer, and the air.

The method for producing an anti-allergen filter according to the invention can comprise the following steps:
  providing a non-woven fibre filter layer having a fibre size between 5 and 30 Dtex per filament, preferably between 10 and 20 Dtex per filament,
  impregnating the composition according to the invention on said non-woven fibre filter layer.

Preferably, the non-woven fibre filter layer is of the "spunbond" type, as indicated hereinabove.

Again, the step of impregnating the composition according to the invention on the non-woven fibre filter layer can be carried out by impregnation techniques known to a person skilled in the art, and are particularly those described hereinabove.

The composition according to the invention can be used to provide a device for purifying the air of a cabin of a motor vehicle, said device having the characteristic of being multifunctional, in that it makes it possible to purify the air by filtering particles, harmful gases present in the air and by inhibiting respiratory allergens.

Such a device comprises successively at least the following layers:
  (i) a non-woven fibre layer arranged to confer rigidity to the device,
  (ii) a filter layer intended to capture gaseous pollutants coming from a gaseous medium and applied on said non-woven fibre layer, and
  (iii) a particle filter layer made of non-woven microfibres, applied on said filter layer intended to capture gaseous pollutants coming from a gaseous medium,
  said non-woven fibre layer (i) being impregnated with the composition according to the present invention.

The non-woven fibre layer (i) arranged to confer rigidity to the device is preferably made of non-woven fibres of the "spunbond" type.

The raw material provided for producing this non-woven fibre layer of the "spunbond" type can be selected from the group consisting of polypropylene, polyester, polyethylene, polyamide, polyurethane, and mixtures thereof.

Preferably, the non-woven fibre layer of the "spunbond" type comprises fibres with an inner layer (core) made of polyethylene terephthalate (PET) and an outer layer, around a core made of PET, polyamide or polypropylene (PP).

This non-woven fibre layer (i) is located next to the inlet of the air to be filtered and can have a thickness between 0.3 and 0.7 mm, preferably between 0.4 and 0.6 mm.

The filter layer (ii) intended to capture gaseous pollutants coming from a gaseous medium comprises an adsorbent material, for example activated carbon.

The particle filter layer (iii) made of non-woven microfibres is obtained by a "melting-blowing" method, more commonly known as "meltblown". Thus, this layer comprises microfibres that make it possible to filter smaller particles, with respect to the non-woven fibre layer (i). The latter can be made of polypropylene.

Preferably, the particle filter layer (ii) made of non-woven microfibres has a fibre size between 1 and 8 Dtex.

In addition, the filter layer (ii) can have a thickness between 0.3 and 1.4 mm.

Use can be made of a support layer (iv) to facilitate the integration of the particle filter layer (iii) into the device according to the invention. Thus, this support layer can thus be located between the filter layer (ii) and the filter layer (iii) made of microfibres.

The method for producing the device for purifying the air of the cabin of a motor vehicle can comprise at least the steps of:
  providing a non-woven fibre layer (i),
  impregnating the composition according to the invention on said non-woven fibre filter layer (i),
  mounting a multilayer structure that successively comprises said non-woven fibre layer (i) and a filter layer (ii) intended to capture gaseous pollutants coming from a gaseous medium, and
  applying the multilayer structure on a particle filter layer (iii) made of non-woven microfibres.

Practically, a non-woven fibre layer (i) of the "spunbond" type can be provided in the form of a coil which is unwound and plunged into a bath containing the composition according to the invention. This step consists of impregnating the non-woven fibre layer (i) with the composition according to the invention.

Such an impregnating of the composition on the non-woven fibre layer (i) of the "spunbond" type can be carried out according to techniques well known to a person skilled in the art, in particular those included hereinabove.

As soon as the non-woven fibre layer (i) is uniformly and homogeneously impregnated over the entire surface, and after drying, this layer (i) is applied, more preferably by gluing, on the filter layer (ii) intended to capture gaseous pollutants coming from a gaseous medium which is possibly applied itself, preferably by gluing, on a support layer, for example made from polyester or polypropylene.

A step of calendering can be used to assemble the layers to one another to make it possible for a good retention of the multi-layer structure.

The particle filter layer (iii) made of non-woven microfibres can then be applied by calendering on the support layer which makes it possible to mutually bind the filter layer (ii) intended to capture gaseous pollutants coming from a gaseous medium and the particle filter layer (iii).

It is of course understood that this mounting can also be carried out in the absence of the support layer. In this case, the particle filter layer (iii) is directly applied on the filter layer (ii) intended to capture polluting gases coming from a gaseous medium.

EXAMPLE 1—COMPOSITION

A composition according to a first embodiment is obtained by mixing 67.275% by weight of water with 32.000% by weight of tannic acid, 0.600% by weight of 3-glycidopropyltrialkyloxysilane, 0.100% by weight of sodium benzoate and 0.025% by weight of an anti-foaming agent.

EXAMPLE 2—COATING

According to a second embodiment, a non-woven fibre layer of the "spunbond" type (core made of PET and body made from polyamide) is impregnated with the composition included in the example 1 by application of a method of impregnation via padding.

EXAMPLE 3—PLEATED COMBINED FILTER

According to a third embodiment, the non-woven fibre layer of the "spunbond" type comprising the anti-allergen coating obtained in the example 2 is glued on a filter layer intended to capture the harmful gases coming from a gaseous medium, which itself is applied by gluing on a particle filter layer made of non-woven microfibres of the "meltblown" type.

A step of calendering of this multilayer system makes it possible to provide a stratified structure wherein all of the layers are sufficiently maintained to one another.

This multilayer structure is then pleated in the form of an accordion to increase the contact surface between the various filter layers and the air to be treated.

Such a device is a combined filter that has an anti-allergen property and is intended to be fitted in the cabin of a motor vehicle in order to purify the air entering the air-conditioning system.

EXAMPLE 4—ELISA TEST

According to a fourth embodiment, the combined filter included in the example 3 was subjected to the ELISA test the result of which indicates that the filter has an efficacy of 50%.

It is of course understood that the present invention is in no way limited to the embodiments described hereinabove and that many modifications can be made thereto without leaving the scope of the appended claims.

The invention claimed is:

1. Aqueous coating composition comprising, with respect to the total weight of the composition:
    between 20% and 45% by weight of at least one allergen denaturing agent comprising a polyphenols-based compound selected from the group consisting of tannic acid, olive leaf extract consisting of oleuropein, and mixtures thereof, and
    at least one compatibilising agent of said at least one allergen denaturing agent which is β-(3,4-epoxycyclohexyl)ethyltrimethoxysilane or β-(3,4-epoxycyclohexyl)ethylmethyldiethoxysilane or an organosilane chosen from the group consisting of 3-glycidopropyltrialkoxysilane, glycidoxypropyltrimethoxysilane, 3-glycidoxypropyltriethoxysilane, 3-glycidoxypropylmethyldimethoxysilane, 3-glycidoxypropylmethyldiethoxysilane, and mixtures thereof; and
    between 40% and 75% by weight of water; wherein the mass ratio between the allergen denaturing agent and the compatibilising agent is between 15 and 70.

2. The composition according to claim 1, wherein the functional silane is γ-glycidoxypropyl trimethoxysilane, γ-glycidoxypropylmethyldiethoxysilane, β-(3,4epoxycyclohexyl)ethyltrimethoxysilane or β-(3,4-epoxycyclohexyl) ethylmethyldiethoxysilane.

3. The composition according to claim 1, further comprising an antifungal agent selected from the group consisting of 1,2-benzisothiazoline-3-one, zinc pyrithione, sodium sorbate, sodium benzoate, and mixtures thereof.

4. The composition according to claim 1, further comprising an anti-foaming agent selected from the group consisting of mineral oil, silicone, alcohol, tributyl phosphate, triethyl phosphate, and mixtures thereof.

5. The composition according to claim 1, wherein the mass ratio between the allergen denaturing agent and the compatibilising agent is between 15 and 35.

6. The composition according to claim 1, comprising 45 and 70% of water, with respect to the total weight of the composition.

7. The composition according to claim 1, comprising between 20 and 35% by weight of allergen denaturing agent, with respect to the total weight of the composition.

8. Article on which the composition according to claim 1 is impregnated.

9. The article according to claim 8, wherein the article is an anti-allergen filter comprising at least one non-woven fibre filter layer on which the composition is impregnated.

10. The article according to claim 9, wherein the anti-allergen filter is a combined cabin filter for a motor vehicle.

11. The article according to claim 9, wherein the non-woven fibre filter layer has a fibre size between 5 and 30 Dtex per filament.

12. The article according to claim 11, wherein the non-woven fibre filter layer has a fibre size between 10 and 20 Dtex per filament.

13. Device for purifying the air of the cabin of a motor vehicle comprising successively:
    (i) a non-woven fibre layer arranged to confer rigidity to the device,
    (ii) a filter layer intended to capture gaseous pollutants coming from a gaseous medium and applied on said non-woven fibre layer, and
    (iii) a particle filter layer made of non-woven microfibres, applied on said filter layer intended to capture gaseous pollutants coming from a gaseous medium,
    said non-woven fibre layer (i) being impregnated with a composition according to claim 1.

14. The device according to claim 13, further comprising a support layer (iv), said filter layer (ii) intended to capture gaseous pollutants coming from a gaseous medium and said particle filter layer (iii) being mutually connected to one another by way of said support layer (iv).

15. The device of claim 13, made by the method comprising steps of:
    providing the non-woven fibre layer (i),
    impregnating the composition on said non-woven fibre filter layer (i),
    mounting a multilayer structure that successively comprises said non-woven fibre layer (i) and the filter layer (ii) intended to capture the gaseous pollutants coming from the gaseous medium, and
    applying the multilayer structure on the particle filter layer (iii) made of non-woven microfibers.

* * * * *